US011180119B2

(12) United States Patent
Dingli

(10) Patent No.: US 11,180,119 B2
(45) Date of Patent: Nov. 23, 2021

(54) SYSTEM AND METHOD FOR AUTONOMOUS VEHICLE PREDICTIVE SENSOR CLEANING

(71) Applicant: Pony AI Inc, Grand Cayman (KY)

(72) Inventor: Robert Dingli, Cupertino, CA (US)

(73) Assignee: Pony AI Inc., Grand Cayman (KY)

( * ) Notice: Subject to any disclaimer, the term of this patent is extended or adjusted under 35 U.S.C. 154(b) by 226 days.

(21) Appl. No.: 16/389,275

(22) Filed: Apr. 19, 2019

(65) Prior Publication Data
US 2020/0331435 A1 Oct. 22, 2020

(51) Int. Cl.
| B60S 1/48 | (2006.01) |
| G01C 21/34 | (2006.01) |
| B60R 1/00 | (2006.01) |
| B60R 11/04 | (2006.01) |

(52) U.S. Cl.
CPC ............... B60S 1/485 (2013.01); B60R 1/00 (2013.01); B60R 11/04 (2013.01); B60S 1/486 (2013.01); G01C 21/3492 (2013.01); B60R 2300/105 (2013.01); B60R 2300/80 (2013.01)

(58) Field of Classification Search
CPC ... B60J 3/04; B60S 1/485; B60S 1/526; B60S 1/548; B60S 1/56; B60R 1/0602; B60W 2420/42; B60W 2555/20; B60W 50/0097; G05D 1/0246; G06T 7/70; G02B 2027/0118; G02B 27/0006
See application file for complete search history.

(56) References Cited

U.S. PATENT DOCUMENTS

| 9,663,073 | B2 | 5/2017 | Tanaka et al. |
| 10,144,394 | B1 | 12/2018 | Rice |
| 10,173,646 | B1 | 1/2019 | Rice et al. |
| 2019/0135239 | A1 | 5/2019 | Rice |
| 2019/0186931 | A1* | 6/2019 | Dittmer ................ G05D 1/0246 |

OTHER PUBLICATIONS

"Daylight Glare: a review of discomfort indexes" to Bellia et al. (2008), pp. 1-10 (Year: 2008).*

* cited by examiner

Primary Examiner — Kenneth J Malkowski
(74) Attorney, Agent, or Firm — Sheppard Mullin Richter & Hampton LLP

(57) ABSTRACT

Systems and methods are directed to obtaining autonomous vehicle sensor data of an autonomous vehicle. In these system and methods that include determining a direction of motion of a vehicle based on a predicted navigational position of the vehicle, determining, based at least in part on the predicted navigational position, a change in a future light positional information that may be received by one or more sensors compared to a current light positional information being received by the one or more sensors and cleaning the one or more sensors of the vehicle prior to the change in the future light positional information and prior to the vehicle reaching the predicted navigational position.

20 Claims, 10 Drawing Sheets

SYSTEM AND METHOD FOR AUTONOMOUS VEHICLE PREDICTIVE SENSOR CLEANING

TECHNICAL FIELD

The present disclosure relates generally to vehicles. In particular, cleaning sensors or cameras of autonomous vehicles as the vehicle may move towards certain environmental conditions.

BACKGROUND

Autonomous vehicles are self-driving vehicles that are capable of sensing the environment and navigating the road without continuous human input. As a result, autonomous vehicles may detect their immediate surroundings using one or more sensors such as but not limited to, radar, LiDAR, cameras, GPS, Odometry, computer vision, and the like.

Autonomous vehicles provide the potential advantages of decreasing traffic collision caused by human errors, such as those caused by delayed reaction time, tailgating, drinking and driving, speeding, distractions, and aggressive driving. While autonomous vehicles technology continues to advance with enhanced driving control systems and safety mechanisms to ensure the reliability and safety of autonomous vehicles, there is still need for improvements.

SUMMARY

The present disclosure introduces methods, systems and devices for better object determination or recognition under poor visibility, such as with bright lighting or reflection, as well as other harsh environmental conditions. Better object recognition and optimal vehicle sensor conditions may enhance the safety of an autonomous vehicle for occupants from their initial pickup location along one or more intermediate paths or routes to their final destination.

A system of one or more computers can be configured to perform operations or actions by virtue of having software, firmware, hardware, or a combination of them installed on the system that in operation causes or cause the system to perform the actions. One or more computer programs can be configured to perform operations or actions by virtue of including instructions that, when executed by data processing apparatus, cause the apparatus to perform the actions. One general aspect includes a system, including: one or more processors; and memory storing instructions that, when executed by the one or more processors, cause the system to perform: determining a direction of motion of a vehicle based on a predicted navigational position of the vehicle; determining, based at least in part on the predicted navigational position, a change in a future light positional information that may be received by one or more sensors compared to a current light positional information being received by the one or more sensors.

The system also includes cleaning the one or more sensors of the vehicle prior to the change in the future light positional information and prior to the vehicle reaching the predicted navigational position. Other embodiments of this aspect include corresponding computer systems, apparatus, and computer programs recorded on one or more computer storage devices, each configured to perform the actions of the methods.

Implementations may include one or more of the following features. The system where the current light positional information includes an angle of light and an intensity of a light beam at the one or more sensors in the direction of motion of the vehicle. The system where the future light positional information includes an angle of light and an intensity of a light beam at the one or more sensors in the direction of motion of the vehicle. The system further including determining if the one or more sensors require cleaning based on sensor data and calculating a navigational route heading and a sensor cleaning algorithm utilizing a route prediction algorithm based on an angle of light and an intensity of light received by the one or more sensors in the direction of motion of the vehicle.

The system where determining if one or more sensors require cleaning based on the current light positional information includes scheduling cleaning of the one or more sensors based on the navigational route heading causing a daylight glare index between 20 to 50 percent. The system where determining if one or more sensors require cleaning includes predicting when the vehicle will be heading substantially directly into a direction of a sun, and scheduling cleaning of the one or more sensors based on an autonomous vehicle position and heading, the navigational route heading, and a time to predict when the vehicle is substantially directly in the direction to the sun. The system where determining if one or more sensors require cleaning includes predicting when the vehicle will be heading substantially directly into a direction of sun glare, and scheduling cleaning of the one or more sensors based on an autonomous vehicle position and heading, the navigational route heading, a time, and a route prediction algorithm to predict when the vehicle is substantially directly in a direction of motion to a sun.

The system where determining if one or more sensors require cleaning includes scheduling cleaning of a camera lens or a visual surface of the one or more sensors that is sensitive to an angle and an intensity of an external light source based on the navigational route heading, a route prediction algorithm, and a current measured debris and contamination condition of at least of one of the one or more sensors in a direction of motion of the vehicle. The system where determining if one or more sensors require cleaning includes scheduling cleaning of a camera lens or a visual surface of the one or more sensors that is sensitive to an angle and an intensity of an external light source based on the navigational route heading, and the route prediction algorithm based on a predicted angle of light and an intensity of light shining on the one or more sensors at an intersection or a road junction that turns into a direct path of the external light source. Implementations of the described techniques may include hardware, a method or process, or computer software on a computer-accessible medium.

One general aspect includes a method being implemented by a computing system including one or more physical processors and storage media storing machine-readable instructions, the method including: obtaining autonomous vehicle sensor data of an autonomous vehicle; receiving data of a navigational route heading and a time/date in a direction of motion of the autonomous vehicle based on the autonomous vehicle sensor data; determining if one or more sensors require cleaning based on a light positional information received as part of the navigational route heading and a time in the direction of motion of the autonomous vehicle; cleaning the one or more sensors based on the light positional information of the autonomous vehicle in the direction of motion of the autonomous vehicle. Other embodiments of this aspect include corresponding computer systems, apparatus, and computer programs recorded on one or more computer storage devices, each configured to perform the actions of the methods.

Implementations may include one or more of the following features. The method where cleaning the one or more sensors based on the light positional information is performed prior a predicted high intensity light event that may occur on the navigational route. The method where the light positional information includes an angle of light and an intensity of a light beam at the one or more sensors in the direction of motion of the autonomous vehicle. The method where determining if the one or more sensors require cleaning based on light positional information includes calculating the navigational route heading and a sensor cleaning algorithm utilizing a route prediction algorithm based on an angle of light and an intensity of light at the one or more sensors in the direction of motion of the autonomous vehicle. The method where determining if one or more sensors require cleaning based on light positional information includes scheduling cleaning of the one or more sensors based on a navigational route heading causing a daylight glare index between 20 to 50 percent.

The method where determining if one or more sensors require cleaning based on light positional information includes predicting when the autonomous vehicle will be heading substantially directly into a direction motion of a sun, and scheduling cleaning of the one or more sensors based on an autonomous vehicle position and heading, the navigational route heading, and the time/date to predict when the autonomous vehicle is substantially directly in the direction of motion of the sun. The method where determining if one or more sensors require cleaning based on light positional information includes predicting when the autonomous vehicle will be heading substantially directly into a direction of sun glare, and scheduling cleaning of the one or more sensors based on an autonomous vehicle position and heading, the navigational route heading, and the time/date to predict when the autonomous vehicle is substantially directly in a direction of motion to a sun.

The method where determining if one or more sensors require cleaning based on light positional information includes scheduling cleaning of a camera lens or a visual surface of the one or more sensors that is sensitive to an angle and an intensity of an external light source based on the navigational route heading, a route prediction algorithm, and a current measured debris and contamination condition of at least of one of the one or more sensors in the direction of motion of the autonomous vehicle. The method where determining if one or more sensors require cleaning based on light positional information includes scheduling cleaning of a camera lens or a visual surface of the one or more sensors that is sensitive to an angle and an intensity of an external light source based on the navigational route heading, a route prediction algorithm based on predicted angle of light and an intensity of light shining on the one or more sensors at an intersection or a road junction that turns into a direction of an external light source. Implementations of the described techniques may include hardware, a method or process, or computer software on a computer-accessible medium.

One general aspect includes a non-transitory computer readable medium includes instructions that, when executed, cause one or more processors to perform: obtaining autonomous vehicle sensor data of an autonomous vehicle; receiving data of a navigation route heading and a time-date in a direction of motion of the autonomous vehicle based on the autonomous vehicle sensor data; determining if one or more sensors require cleaning based on light positional information received as part of a navigational route heading and a time in the direction of motion of the autonomous vehicle; cleaning the one or more sensors based on a light positional information of the autonomous vehicle in the direction of motion of the autonomous vehicle; and determining if the one or more sensors require cleaning based on sensor data and calculating the navigational route heading and a sensor cleaning algorithm utilizing a route prediction algorithm based on an angle of light and an intensity of light received by the one or more sensors in the direction of motion of the autonomous vehicle. Other embodiments of this aspect include corresponding computer systems, apparatus, and computer programs recorded on one or more computer storage devices, each configured to perform the actions of the methods.

Implementations may include one or more of the following features. The non-transitory computer readable medium where determining if one or more sensors require cleaning based on a current light positional information includes scheduling cleaning of the one or more sensors based on the navigational route heading causing a daylight glare index between 20 to 50 percent. Implementations of the described techniques may include hardware, a method or process, or computer software on a computer-accessible medium.

Various embodiments of the present disclosure include systems, methods, and non-transitory computer readable media configured to obtain autonomous vehicle sensor data of an autonomous vehicle. One or more autonomous vehicle actions of the autonomous vehicle are predicted based on the autonomous vehicle sensor data.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

The present disclosure, in accordance with one or more embodiments, is described in detail with reference to the following figures. The figures are provided for purposes of illustration only and merely depict typical or exemplary embodiments.

Figure 1:
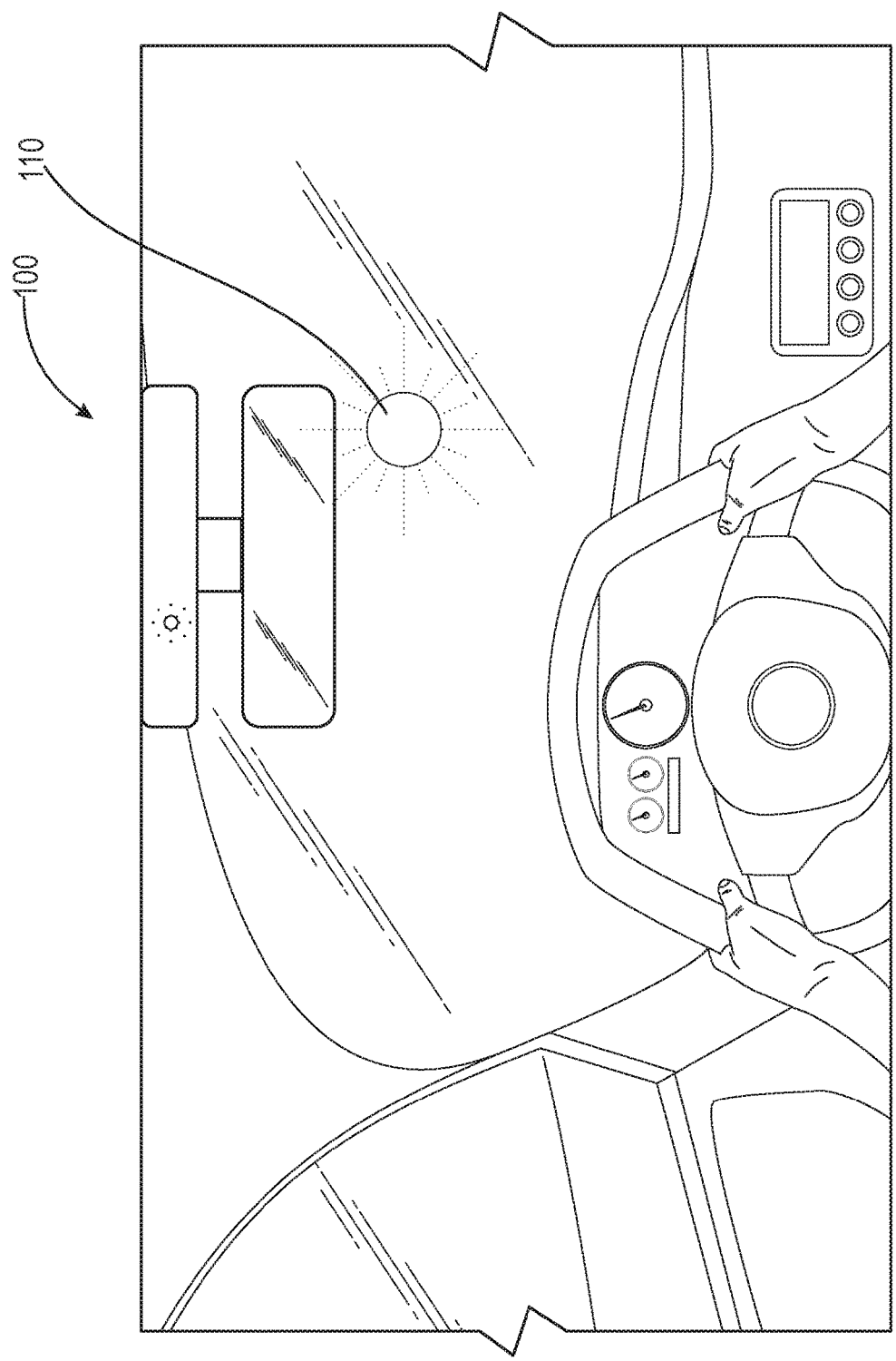
FIG. 1 is an image illustrating an example of an external light source that is causing glare to one or more sensors in a direction of motion of the autonomous vehicle in accordance with various embodiments of the disclosure.

The figures are not exhaustive and do not limit the present disclosure to the precise form disclosed.

DETAILED DESCRIPTION

Autonomous vehicles (AV) may include one or more cameras, sensors and equipment to recognize or detect one or more objects around the vehicle. The AV control system may use a combination of the vehicle position and heading, navigation-based route information (e.g., navigation route heading) and time/date information to predict into the future when the vehicle will be heading directly into an external light source such as the sun. The camera sensor cleaning algorithm may be scheduled to clean the lens or external visual surface prior to these more critical times, as required. As such, the camera sensor cleaning algorithm reduces or prevents a degradation of camera image quality during the process of cleaning a camera sensor lens during exposure to certain external lighting conditions. Such conditions include directional light where visual surface is sensitive to the angle as well as intense light such as that of the sun. Moreover, a method is disclosed for scheduling camera sensor cleaning to avoid glare from the sun during cleaning process in an autonomous vehicle.

The autonomous vehicle system obtains the autonomous vehicle sensor data. Such data includes navigation-based route information (navigation route heading) and time-date information in a direction of motion of the autonomous vehicle. One or more sensors may be cleaned based on light positional information received as part of the navigation and time-date information. After cleaning the one or more sensors based on a sensor cleaning algorithm, the autonomous vehicle direction of motion adjusts based on received navigation and time-date information utilizing one or more autonomous vehicle actions. The light positional information includes an angle of light and an intensity of the light from an external light source, (such as the sun) at the one or more sensors, for example, in the direction of motion of the autonomous vehicle. In one example, a sensor cleaning algorithm machine may determine when to clean the sensor based on location, future route, road intersections and the timing of one or more external light sources are relative to a direction of motion of the autonomous vehicle.

The sensor cleaning algorithm determines a sensor cleaning schedule for the one or more sensors based on machined learned locations and the location's environmental conditions, e.g., position and angle and intensity of an external light source to the sensors, weather conditions, and the like. A route prediction algorithm calculates a navigational route heading responsive to navigation and time-date information and the sensor cleaning schedule in the direction of motion of the autonomous vehicle. One or more sensors may be cleaned when navigation and time-date information indicate a navigational route direction that causes a daylight glare index between 20 to 50 percent.

In another example, one or more sensors may require cleaning based on light positional information. For example, light position information predicts when the autonomous vehicle heads substantially directly into a direction of the sun. In another example, the scheduled cleaning of the one or more sensors prior to when the autonomous vehicle will be heading substantially directly in a direction of motion of the sun is based on an autonomous vehicle position, direction, navigation based route information, and a time/date of information.

In some embodiments, one or more sensors require cleaning based on light positional information. This includes predicting when the autonomous vehicle will be heading substantially directly into a direction of sun glare. Furthermore, scheduled cleaning of the one or more sensors can be done prior to utilizing route prediction algorithm adjusting the navigational route. The navigational route may be modified based on the autonomous vehicle position and the navigation route heading, and a time/date to predict when the vehicle is substantially directly in a direction of motion into the sun.

In some embodiments, one or more sensors require cleaning based on light positional information. This includes scheduling cleaning of a camera lens or a visual surface of the one or more sensors that is sensitive to an angle or intensity of an external light source based on the navigational route direction, and a route prediction algorithm. In a related embodiment, measurement of the current debris level and contamination condition at one or more sensors in the direction of motion of the autonomous vehicle may be used by the autonomous vehicle system to determine cleaning schedules.

In some embodiments, one or more sensors require cleaning based on light positional information includes scheduling cleaning of a camera lens or a visual surface of the one or more sensors that is sensitive to an angle and an intensity of an external light source based on a navigational route heading, route prediction algorithm based on predicted angle of light and an intensity of light shining on the one or more sensors at an intersection or a road junction that turns into a direct of an external light source.

Referring to FIG. 1, is an image 100 illustrating an example of an external light source 110 that is causing glare to one or more sensors in a direction of motion of the autonomous vehicle in an accordance with various embodiments of the disclosure. As shown in FIG. 3A, the autonomous vehicle features a sensor system 304, communication network 308, and a smart sensor cleaning system 310 that can prevent the degradation of camera image quality by cleaning the lens or external visual surface prior to the vehicle reaching a predetermined sun glare event. Furthermore, the smart sensor cleaning system 310 may use the vehicles current position and the predicted future positions to determine a cleaning schedule. The vehicle's position and heading, navigation based on route information and time/date information to predict in the future when the vehicle will be heading directly into an external light source, e.g., the sun, as the autonomous vehicle drives along a road, e.g., entering and turning at intersections facing an external light source, and continuing down a road as illustrated in FIGS. 2, 3A-3F.

When the autonomous vehicle is driving into an external light source, such as the sun, a spotlight, lighted area, reflected light, or other highly lit environments, the glare/haze can obstruct the occupant's vision and negatively affect the occupant's and the vehicle sensors' detection or recognition of external objects or road conditions. This in turn can affect the vehicle's navigation and hazard detection. For instance, the vehicle system may use timed sequential light pulses (e.g., LiDAR) that reflect off the surface of the one or more objects or road surfaces and captured by the autonomous vehicle.

In exemplary embodiments, the sensor system intelligently schedules and performs cleaning of one or more sensors prior to certain vehicle critical actions which can include, but are not limited to, changing directions, changing lanes, turning right, turning left, backing up, performing a U-turn, stopping, slowing down and the like. As exemplified in FIG. 3A, lens cleaning can be performed prior to planning a route, by utilizing route prediction algorithm 316. Navigation to the destination, can be based on navigational route heading 314, using time/date data 312 information, collected by the autonomous vehicle. It may be also based on an intermediate and/or first stop and/or a second stop and/or destination information from a profile or a text message from occupants of the autonomous vehicle.

Figure 2:
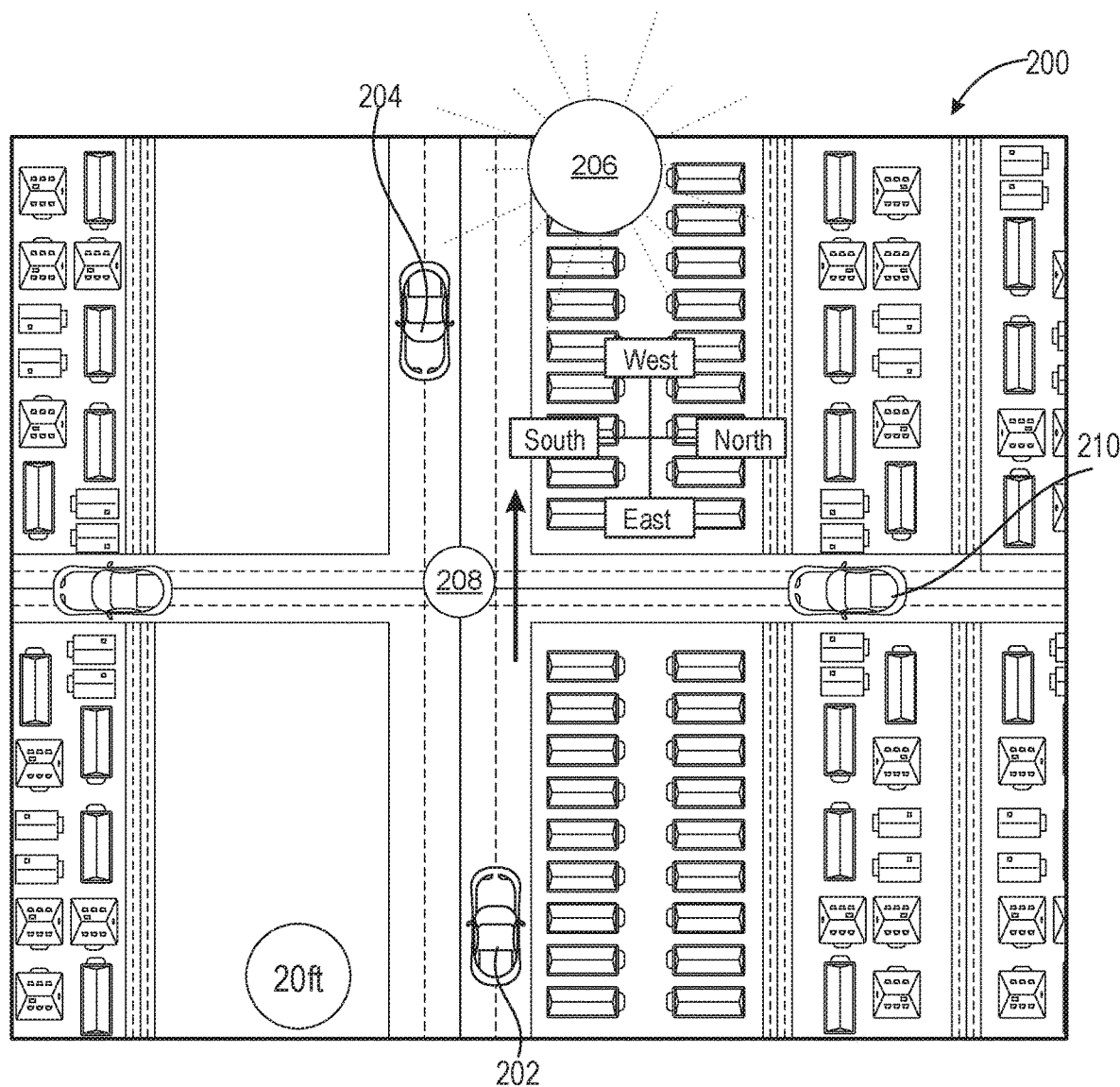
FIG. 2 is an image illustrating an example of an intersection where an external light source is causing glare to one or more sensors in a direction of motion of the autonomous vehicle in accordance with various embodiments of the disclosure.
Figure 3A:
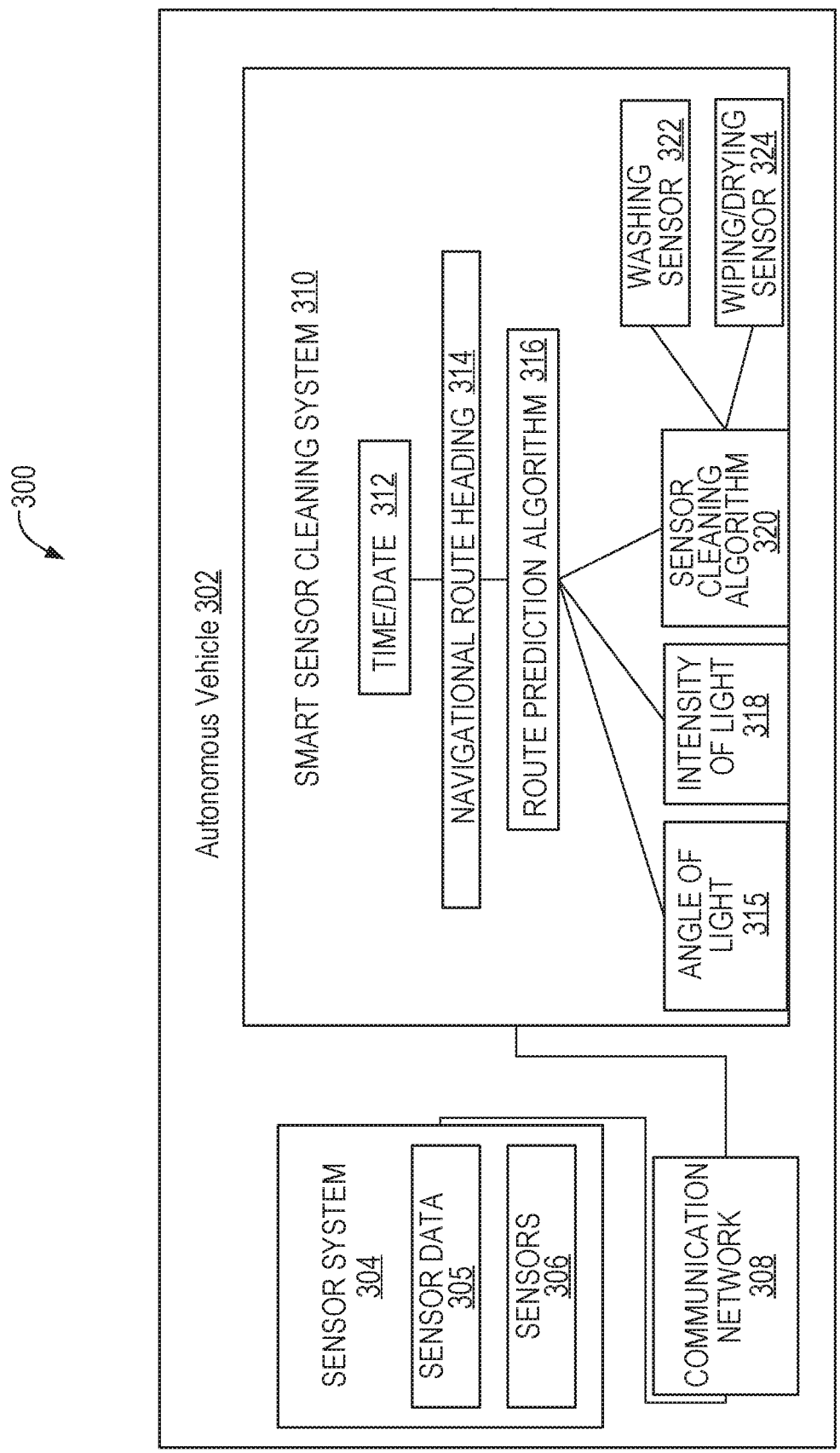
FIG. 3A is a schematic showing an example of an autonomous vehicle sensor system and smart cleaning system in accordance with various embodiments of the disclosure.

FIG. 2 is an image 200 illustrating an example of an intersection where an external light source or sun 206 is causing glare on to one or more sensors in a direction of motion of the autonomous vehicle in accordance with exemplary embodiments of the disclosure. As shown in FIG. 2, the autonomous vehicle 202 drives westbound into the sun, toward an intersection 208. The vehicles 204 drives eastbound toward the intersection 208 as well. Further, autonomous vehicle 210 drives southbound toward intersection 208. The autonomous vehicle 202 has may have the sun directly in-front of its path as indicated in time/date data, (see, e.g., time/date data 312 FIG. 3A), along its navigational route heading (see, e.g. navigational route heading 314 of FIG. 3A) based on its route prediction algorithm (see, e.g. navigational route heading 314 of FIG. 3A) to a critical event. The critical event here being two or more of the vehicles being located approximate at the intersection 208 at the same time.

Figure 3B:
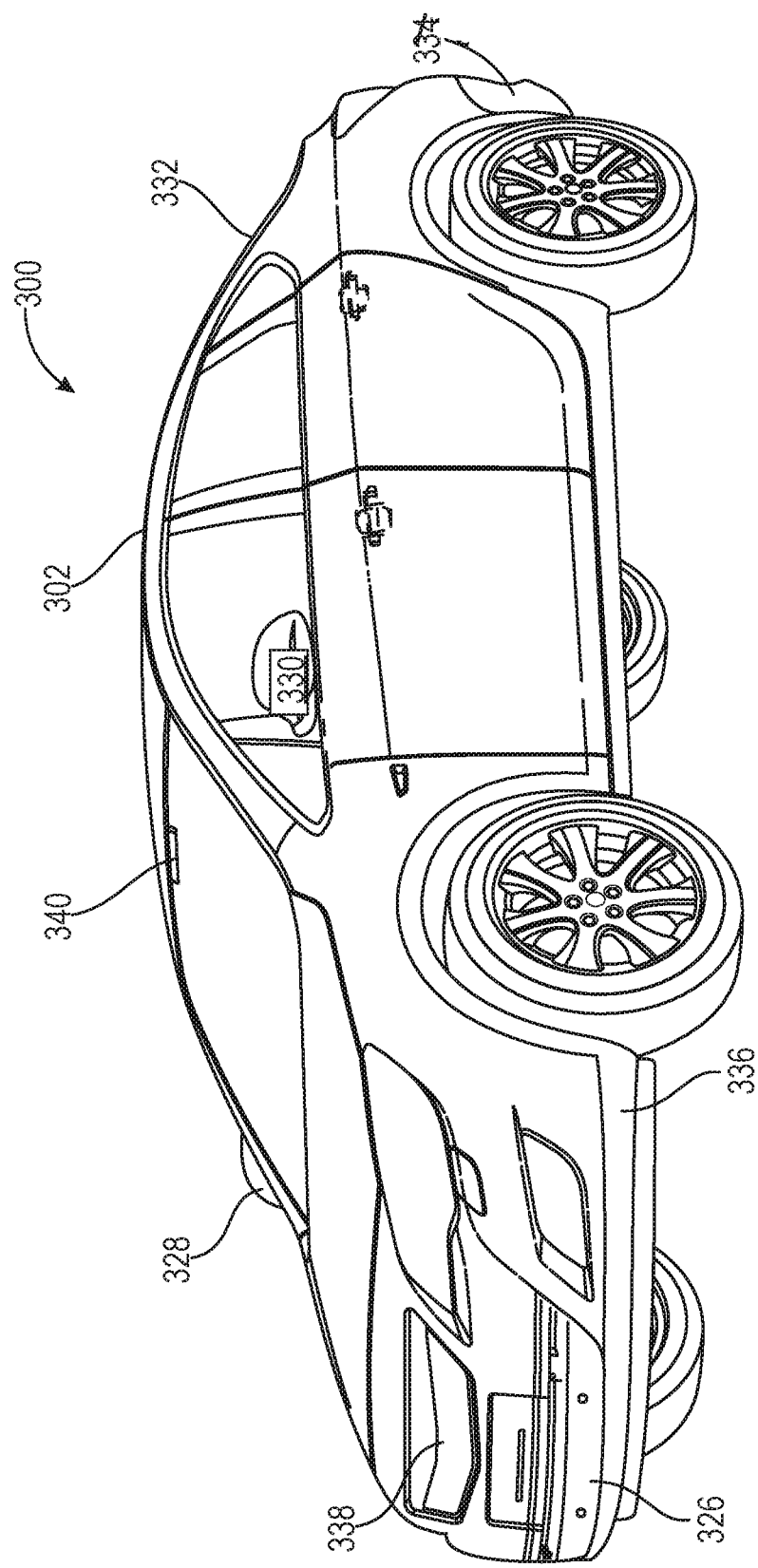
FIG. 3B is an illustration showing multiple sensors on an autonomous vehicle accordance with various embodiments of the disclosure.
Figure 3C:
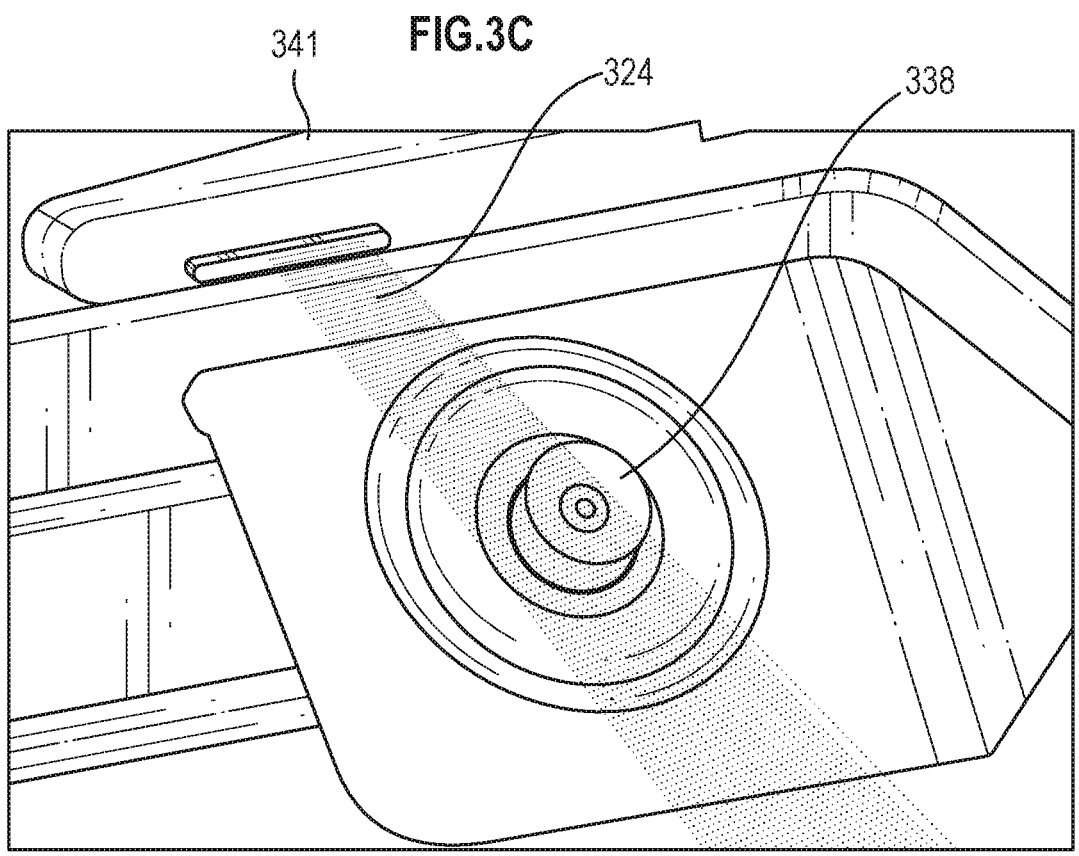
FIG. 3C provides images of a front sensor and a rear sensor of an autonomous vehicle being cleaned in accordance with various embodiments of the disclosure.
Figure 3D:
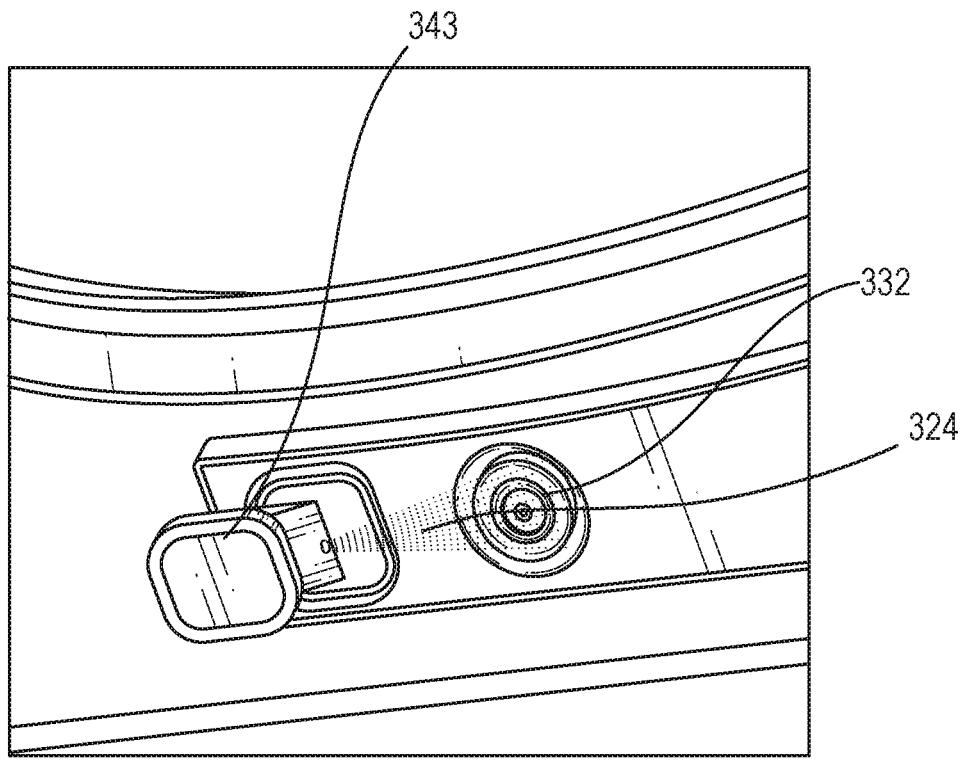
FIG. 3D provides images of a front sensor and a rear sensor of an autonomous vehicle being cleaned in accordance with various embodiments of the disclosure.

The autonomous vehicle can schedule and perform cleaning of one or more sensors. For instance, the autonomous vehicle 202 system may, based on the sensor cleaning algorithm 320, clean front sensors 338, left side sensors 336 and right-side sensors 326, as shown as shown in FIGS. 3A to 3F. As illustrated in FIGS. 3C and 3D, the high pressurized water washers 341, 343 clean sensor lens and external lens surface. In another example, the high pressurized water washer 341, 343, and/or a wiper action may clean the lens and/or external visual surface, prior to autonomous vehicle 202 reaching the intersection 208. As a result, accuracy and collision avoidance for the autonomous vehicle 202 will be improved due to reduction in sun glare/reflection at the autonomous vehicle 202.

Angle and intensity of the predicted light and how dirty the sensor is should be factored into timing and degree of cleaning required. In the exemplary embodiments, the angle of light 315 and the intensity of light 318 hitting a front vehicle sensor 338, a left side vehicle sensor 336, and a right-side vehicle sensor 326, may be considered to perform lens cleaning such that less light is reflected on the lens (or lens surface). The clean sensor lens or external sensor surface provides a more accurate indication of relative position, such as distance and location, of the autonomous vehicle 202 with respect to vehicles 204, 210 and intersection 208.

The schematic provided in FIG. 3A also relates to mirror sensor data. For instance, here the sensor system 304 includes sensor data 305 and sensors 306. For example, as illustrated in FIG. 3B, the sensors 306 collectively include a front vehicle sensor 338, a left side vehicle sensor 336, a right side vehicle sensor 336, a left mirror sensor 330, a right mirror sensor 328, a rear view mirror sensor 340, a rear sensor 332, a left side rear sensor 334 and a right side mirror sensor 334.

In an exemplary embodiment, communication network 308 comprises an electronic control unit ("ECU") for performing various system functions. The ECU can comprise memory storage devices to store data, and instructions. The instructions may list conditions and threshold requirements for predicted a future high intensity light event or detecting whether the sensor or external visual sensor has debris or other information. The ECU may detect whether the autonomous vehicle 302 is on or off. If the autonomous vehicle 302 us on, the ECU may then turn on sensor condition detector. In one example, the ECU may utilize any one of the sensors 306, and navigation route heading 314 information, as well as radars, laser scanners in communication with the ECU, to detect and predetermine lighting conditions.

The communication network 308 may include a CPU that performs various computations from the data gathered by the sensor 306, navigation route heading 314, radars, and laser scanners. Such computations may include determining the current light position information and possibly future light positions information, for example along a direction of motion, of the autonomous vehicle based on the GPS route guidance input from the navigation route heading 314. Additionally, the future navigational position of the autonomous vehicle may be continuously modified and updated and adjusted by continuously factoring in the immediate and future lighting condition. Moreover, the system may use machine learning or artificial intelligence to improve sensor performance and cleaning schedule along frequently navigated routes. That is, past data may be also used to predict when lens cleaning should be scheduled and performed based on predicted route that may expose the lens to a light source.

Moreover, the system may use artificial intelligence to improve performance along frequently navigated routes. That is, past data may be also used to improve the algorithm for scheduling and performing lens cleaning or cleaning the external visual surface of the sensor or camera. For instance, the system may store information related to a previous sequences where cleaning was performed based on predicted future light positional information. Thus, the data may indicate that the system cleaning was initiated at certain time interval before the vehicle reaches a position where the sun light affects the sensor, but proper cleaning was not completed in sufficient time resulting in poor sensor performance. Accordingly, the system may adjust future cleaning to occur an earlier time. Alternatively, or additionally, the system algorithm may use a different cleaning technique such as a different fluid, wiping, air stream drying, or a combination thereof. The system may also store data regarding the coordinates of a position where the light intensity, light direction, amount of debris substantially affects the sensor performance. Accordingly, the algorithm may, determine if the vehicle is likely to reach those coordinates along its route, and schedule the appropriate cleaning.

Detecting the current and future environmental conditions may be determined by analyzing the one or more data, such as autonomous vehicle data, gathered by the sensor 306, navigation route heading 314, route prediction algorithm 316, radars, and laser scanners. The communication network 308 may be connected to various vehicle components, devices, and systems to detect certain environmental, road, and/or driving conditions to determine the future routing data, such as direction of motion, of the autonomous vehicle. For example, the communication network may include an I/O module that is in communication with the sensors 306, navigation route heading 314 module, and route prediction algorithm 316 module, communication systems, radar, and laser scanners. These various vehicle components may be used individually or in combination with one another to detect the environment, road, and/or driving conditions in real time.

The sensors 306 may be mounted essentially anywhere on the vehicle including interior and exterior of the autonomous vehicle. In some embodiments, the sensors 306 may be a still camera, video camera and other types of sensors that capture images, videos or other data from all directions including the front, sides, and rear surrounding areas of the vehicle. The sensors 306 may be oriented to take images and videos of preceding vehicles and oncoming vehicles, as well as pedestrians, objects, and road conditions surrounding the general vicinity of the vehicle. Moreover, the sensors 306 may detect the direction and intensity of external light sources.

The autonomous vehicle 300 depends on the sensors 306 to be able to detect various items during low light conditions and high intensity light conditions. In some instances, images captured by the sensors 306 may be processed with object recognition software. By way of example, the sensors 306 may capture images and/or videos of the surrounding vehicle environment, which may include potential pedestrians, traffic lights, road signs, oncoming vehicles, preceding vehicles, and the like. The images and/or videos may then be processed by the CPU, where they may be filtered with one or more object recognition software.

There may also be a plurality of sensors 306 connected to the I/O module, where the sensors 306 may be used to detect various objects, environmental, road, or driving conditions. Sensors 306 may detect distance between vehicles (e.g. radar sensors), speed of current autonomous vehicle travel (e.g. accelerometer and speedometer), object detection (e.g. radar sensors), motion detection (e.g., motion sensors), moisture detection (e.g., moisture detection sensors), steering handling detection (e.g., steering wheel sensors), and the like. The sensors 306 and/or in combination with the cameras, navigation route heading 314, radar, the laser scanners, and communication systems may be used to collect data in real time, which may then be processed by the CPU.

The navigation route heading 314 and route prediction algorithm 316 may also be connected to the I/O module associated with and connected to communication network 308. The navigation hardware associated with the navigation route heading 314 may include a navigation processor, a navigation adjustment component, and a GPS component. In exemplary embodiments, the navigation hardware may determine the location of the vehicle in real time and determine the current and upcoming road and traffic conditions using a GPS component (which may include or be a GPS receiver). In some embodiments, the navigation route heading 314 may receive information from third party service providers, such as current traffic information, weather information, sunrise, sunset, sun intensity, angle of sun light, road construction information, and the like. While the navigation route heading 314 may provide the quickest route or provide a route based on driver specifications (e.g., no toll road, no highways, no private roads, etc.), the autonomous vehicle 300 may also utilize the sensors 306, the radar, the laser scanners, and the communication systems to determine the route for the autonomous vehicle in real time.

The communication system may also include vehicle-to-vehicle communication systems and/or vehicle-to-infrastructure communications systems, which can be used to share data and information amongst autonomous vehicles and/or data and information from roadside units. Shared data may include detecting the intensity of light and the angle of light at an upcoming intersection or future predicted route or location. Share data may further include current light position information and future light position information at various locations. Shared data and information may include data collected by the autonomous vehicle, such as safety information, locations of curved or hilly sections of road which may have beams of high intensity light, location of other autonomous vehicles, presence of upcoming of road signs, presence of reflected light from a building and the like. The ECU may then use such gathered information to further determine the safest upcoming trajectory of the autonomous vehicle in real time. A radar and laser scanner may also be connected to the I/O module. The radar may utilize electromagnetic radiation to detect other vehicles or objects located near the autonomous vehicle. Additionally, the laser scanner may emit a light beam such that when the light beam is reflected back after hitting a surface of an object in the environment, objects may then be detected.

A vehicle communication program may each reside in communication network 308. The vehicle communication program may have the ability to send and receive messages concerning lighting, directionality of the light, sun light, reflected sun lights, safety, environment, road, and driving conditions. In general, the communication network 308 can be any combination of connections and protocols that can support communications with electronic devices such as laptops, tablets and mobile phones. The communication network 308 can include, for example, a local area network (LAN), a wide area network (WAN), such as the internet, a cellular network, or the combination of the preceding, and can further include wired, wireless, and/or fiber optic connections.

Thus, by way of example, data gathered from the sensors 306, the navigation route heading 314, the route prediction algorithm 316, radar, and laser scanners can be shared with the vehicle utilizing the communication system. In other words, data provided by the communication system may be analyzed, factored and assessed to further help determine the route and lighting consof the autonomous vehicle. The CPU may be able to make such a calculated determination using the sensors 306, the navigation route heading 314, radar, the laser scanners, and communication systems as described in detail above.

In some embodiments, the communication network 308 may be in communication with other vehicles nearby with their own corresponding compatible communication system configured to transmit and receive communication from other networks or communication systems. The upcoming trajectory path may be determined based on the information provided by the sensors 306, navigational route heading 314, route prediction algorithm 316, radar, laser scanners, and speakers.

Figure 3E:
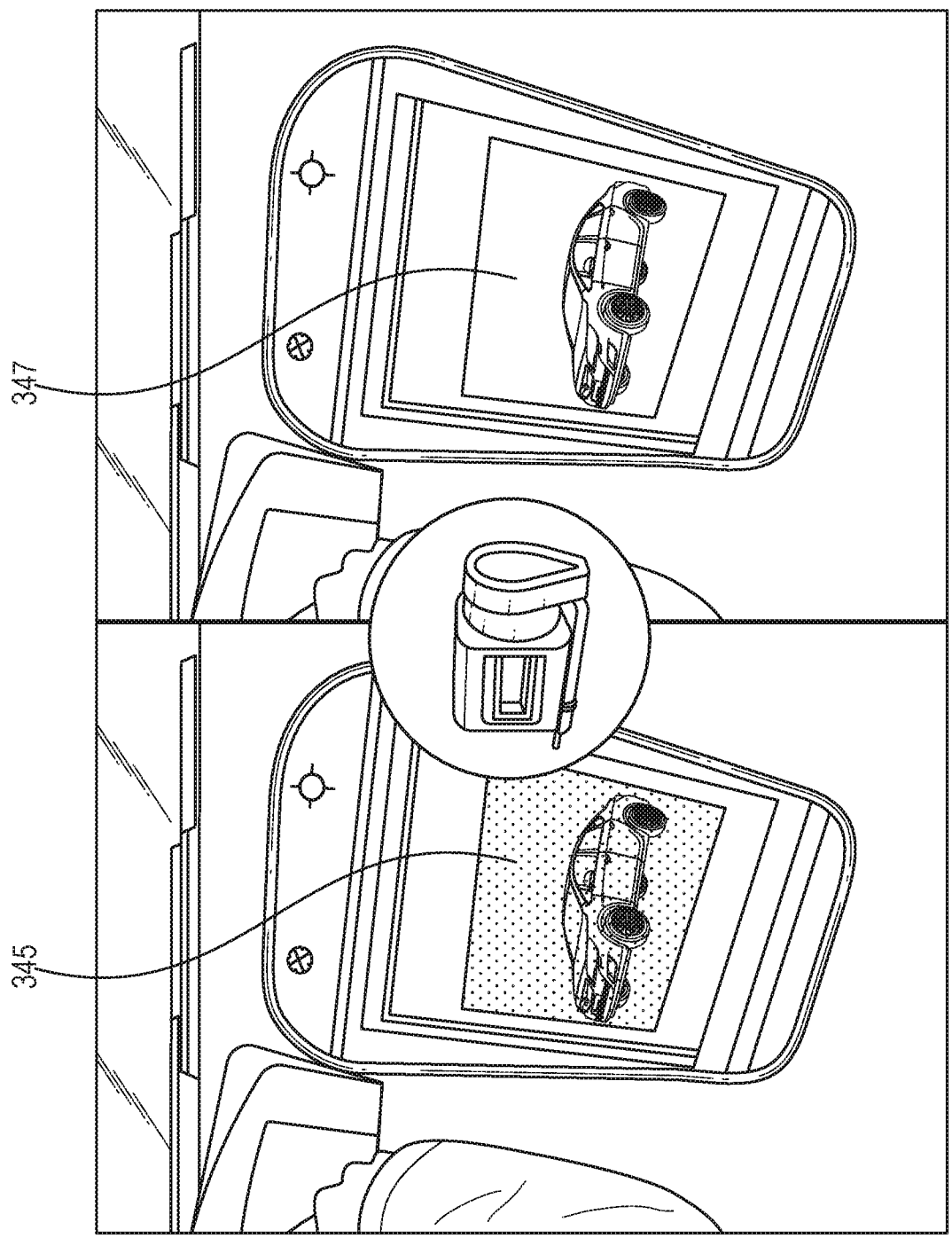
FIG. 3E is an illustration of a vehicle image before and after one or more sensors are cleaned in a direction of motion along a road in accordance with various embodiments.

FIG. 3E is an image of a front sensor and a rear sensor of an autonomous vehicle being cleaned in accordance with various embodiments of the disclosure. As illustrated, sensors 306 receive autonomous vehicle sensor data to capture images (or image data) of regions surrounding the autonomous vehicle. For example, front vehicle sensor 338 lens area is cleaned using pressurized heated water, for example, pressurized heated water. Cleaning liquids other than water, that are suitable for cleaning the lens surface, are may be used. Suitable characteristics may include fast evaporation and lack of residue after evaporation. In yet another example, rear vehicle sensor 344 lens area is cleaned using pressurized heated water. In one example, the pressurized water is selected within pounds per square inch (psi) range between about 50 psi to about 200 psi. In yet another example, the pressurized washer may include a wiper blade (not shown) to assist with cleaning larger particle matter on the lens area. In yet another example, the heated pressurized water uses heat from a vehicle engine to warm washer fluid to better clean lens area. In yet another example, a transparent adhesive film may be placed over the lens area to maintain cleanliness of the lens area. In yet another example, a specialized coating can be placed over the lens area and a heating module and retractable high-pressure sprayers that keep sensors free from dirt, rain, and ice.

As further illustrated in FIG. 3E, an illustration of a vehicle image in a direction of motion of an autonomous vehicle display system before and after one or more sensors are cleaned in a direction of motion along a road in accordance with various embodiments.

The image 345 shown in FIG. 3E, suffers from degradation of sensor image quality which can be addressed using the smart sensor cleaning system 310 of FIG. 3A. The improved image 347 captured after performing sensor cleaning algorithm 320 from washing sensor 322 and/or wiping/drying sensor 324. Washing sensor 322 processes an image of the sensor area, e.g., sensors 306, and feeds back the image information to sensor cleaning algorithm so that a sensor cleaning algorithm 320 will be implemented during planning a navigational route heading 314 based on time/date data 312. For example, sensor cleaning algorithm will be implemented during critical conditions based on, adverse weather or environmental conditions, e.g., rain, snow, sleet, flooding, road constructions, closed highway lanes, concrete barriers or posts that are proximate to the autonomous vehicle 302.

As a result, navigational route heading may be adjusted for the autonomous vehicle's 302 direction of motion along a route path. The sensor cleaning algorithm may determine critical conditions that may occur by receiving information from the route prediction algorithm 316. For example, when the autonomous vehicle 302 enters an intersection, such as intersection 208 shown in FIG. 2, the system can predict any or all the following re-routing situations: right turn, left turn, straight through left-elbow arrow, arc turn in a clockwise direction, turn in a counter clockwise direction, U-turn or the like.

Figure 3F:
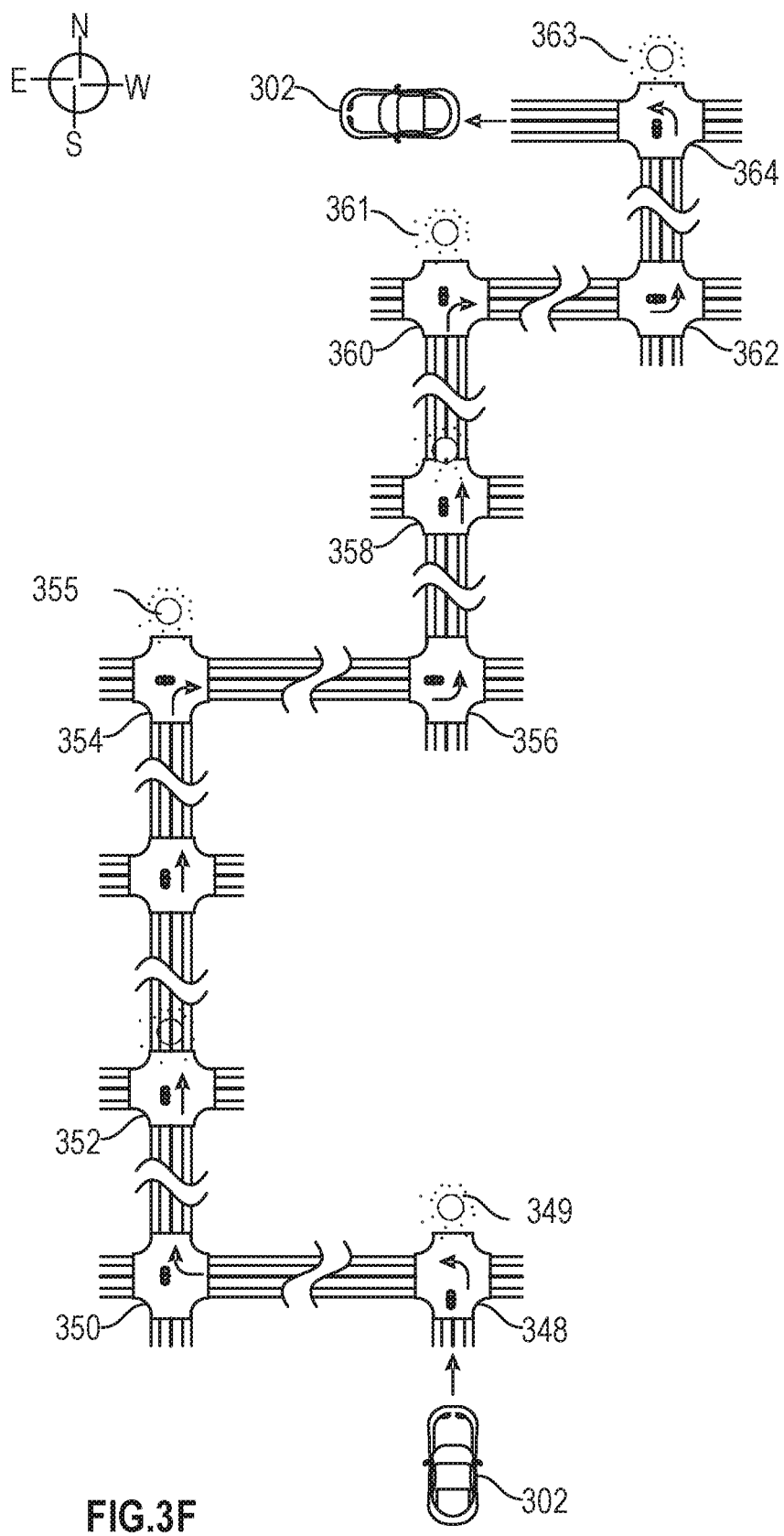
FIG. 3F is a conceptual representation of an autonomous vehicle entering a navigational route using route prediction algorithm with navigational time/date information and its relative position to an external light source, (e.g., the sun) in accordance with various embodiments.

FIG. 3F is a conceptual illustration of an autonomous vehicle entering a navigational route using route prediction algorithm with navigational time/date information and its relative position to an external light source, e.g., the sun, in accordance with exemplary embodiments.

In FIG. 3F (and referencing FIGS. 3A-3E), the autonomous vehicle 302 sensor system 304 collects time/date data 312 information including weather and position information when entering an intersection 348. This includes relative position and brightness of the sun 349 at that time and location.

To minimize error and maximize directionality of navigational route heading 314 due to the angle of the light 315 and the intensity of the light 318, autonomous vehicle 302 washing sensor 322 indicates whether or not a cleaning is required (reviews sensor cleaning algorithm) of a lens area of the front sensor 338 and left side sensor 336. If washing sensor 342 indicates a dirty lens area and time/date information indicates directly driving into an external light source 349, then the washing sensor 342 sprays high pressure fluid (heated or room temperatures), e.g., pressurized fluid within a range of 20 to 200 psi, to clean the lens area before route prediction algorithm 316 changes navigation route heading 314 and making a left turn at intersection 348.

At intersection 350, the autonomous vehicle 302 is turning into an external light source 355 and based on this time/date information the system determines if cleaning is required. For example, if washing sensor 342 indicates a dirty lens area and time/date information of right turn sensor 338 and the autonomous vehicle 302 is driving directly into the external light source 355, then the washing sensor 342 sprays high pressure heated fluid (e.g. pressurized heated fluid within a range of 20 to 200 psi), to clean the lens area before making a left hand turn at intersection 350. As autonomous vehicle 302 enters intersection 352, 354, then depending on the distance and environmental conditions contained in time/date data information, will be washed and an adjusted navigational route heading 314 using route prediction algorithm 316.

Finally, similar principles apply for intersection 356, 358, 360, 362, 364 depending on the state of the sensors. The sensor cleaning algorithm 320 and route prediction algorithm 316, front vehicle sensor 338, right side sensor 326, and left side sensor are cleaned and navigational route heading 314 adjusted based on detecting external light source 363 (detect if dirty by washing sensor 322 and clean if so at intersection 360) in direction of turning of the autonomous vehicle or absence of external light source 363. For example, critical to clean left turn sensor 336 if detected dirty by washing sensor 322 at intersection 362. In yet another example, critical to clean left turn sensor 336 if detected dirty by washing sensor 322 at intersection 364.

Figure 4:
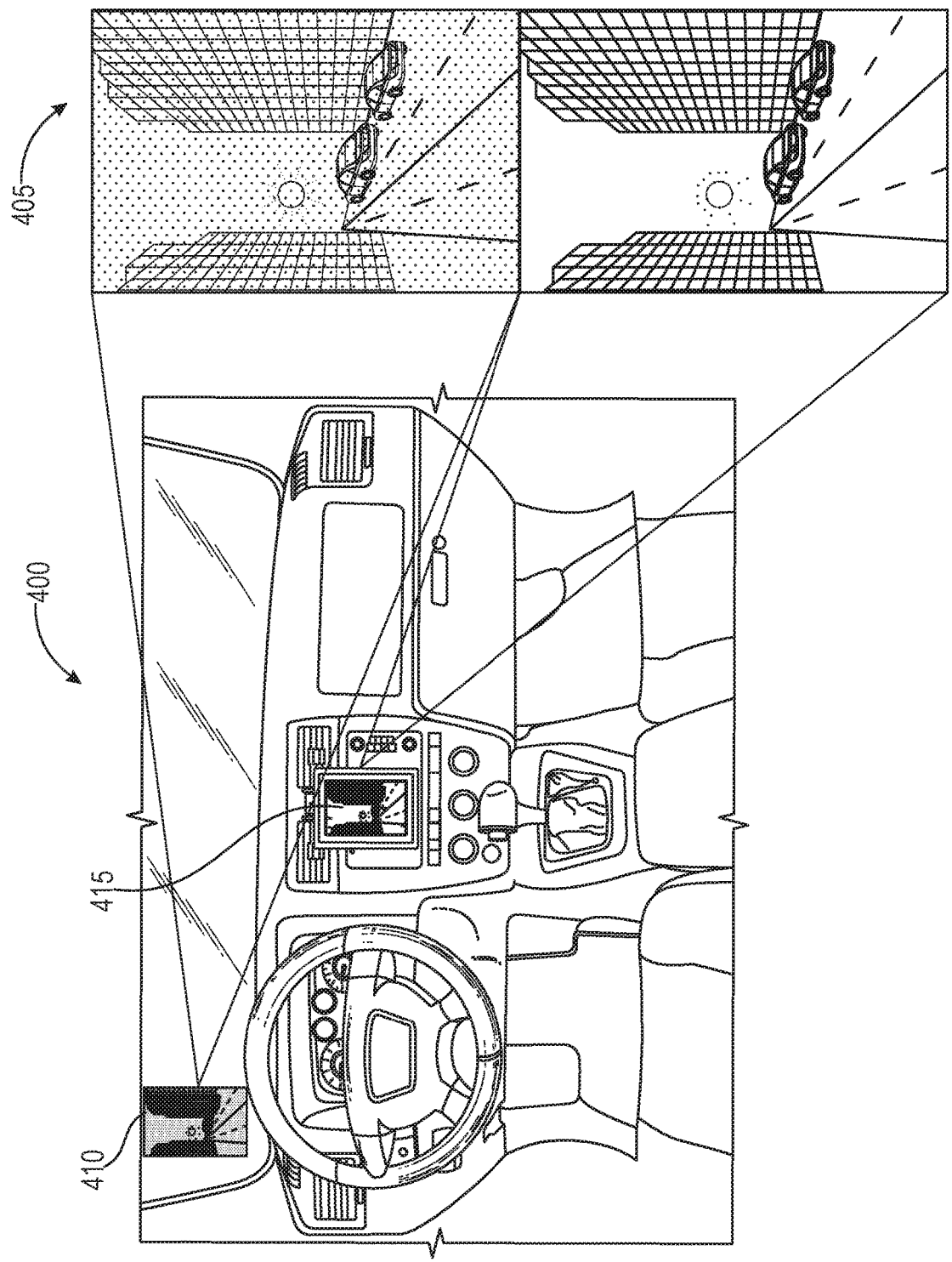
FIG. 4 is an illustration of an autonomous vehicle heads up display and interior monitor display (before and after one or more sensors are cleaned) of vehicle in a direction of motion of the autonomous vehicle in a direction of motion along a road in accordance with various embodiments.

FIG. 4 is an illustration of an autonomous vehicle with the sensor representation of the before and after one or more sensors are cleaned. Furthermore, a display makes the object image hover in space before an occupant's eyes, and directing them to take actions, including manual control if necessary, by directing their attention around an object just like playing a video game. For example, speedometer readings, speed view information including radio stations, U-tube stations, multi-media playlists, and the like, including turn-by-turn directions can be provided (as a windshield overlay) within a field of vision (e.g., direct line of sight) of the occupants.

As illustrated, either one or both of the display screens 410, 415 may illustrate the road and environmental conditions surrounding the autonomous vehicle 400. The illustrated road and environmental conditions may be detected by the autonomous vehicle's 400 camera, navigation system, radar, the laser scanners, and communication systems. Such identified objects and road conditions may be identified and presented on the display screen 410 or display screen 415.

By way of example, the display screen 410, 415 may present the following information as displayed in enlarged format at the display screen 405 (enlarged version of display screens 410, 415). Such information may include the autonomous vehicle's current location and may even identify detected road and environmental conditions, such as other vehicles or pedestrians.

Figure 5:
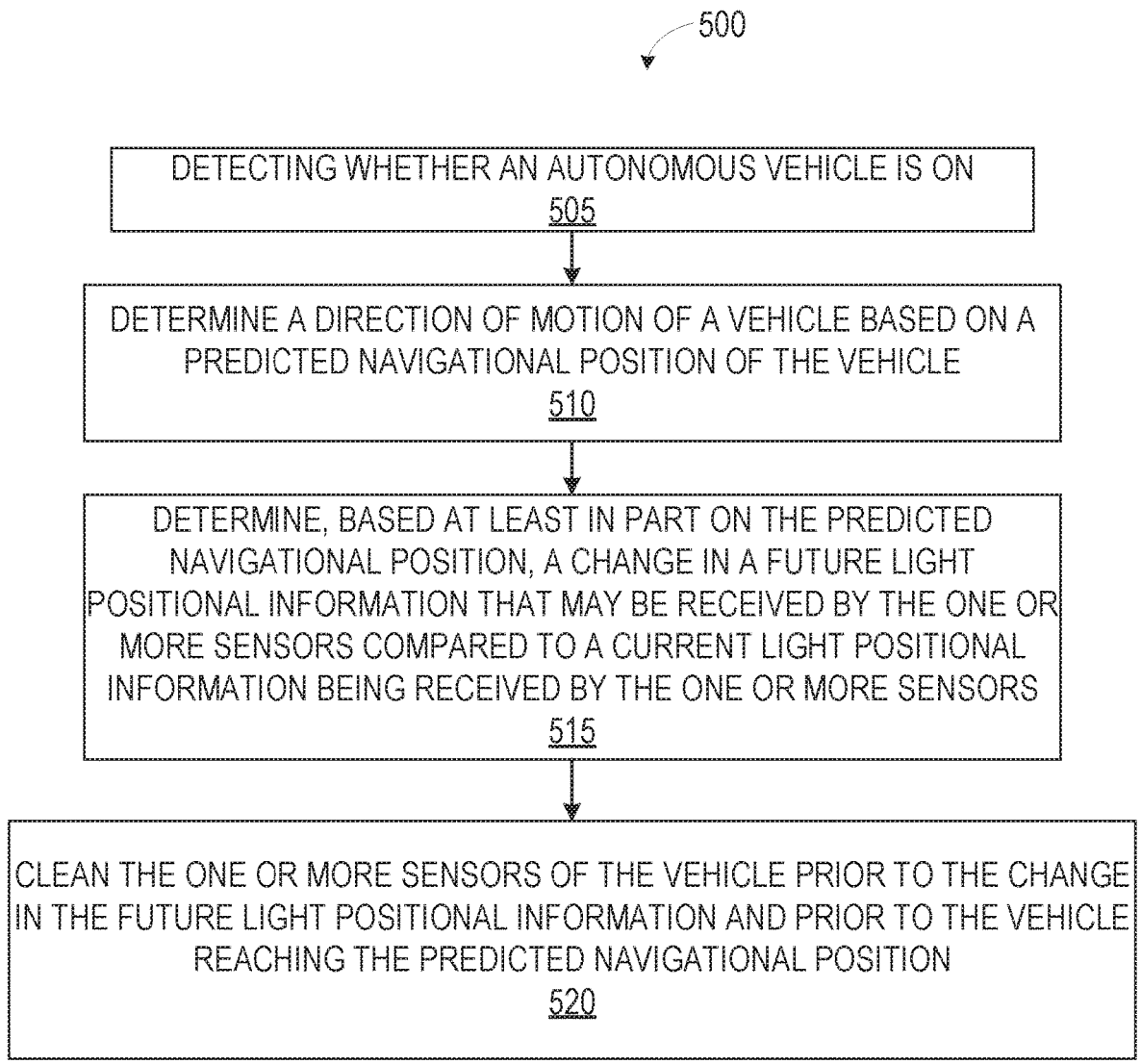
FIG. 5 is a flow diagram providing an exemplary process for predictive sensor cleaning system of an autonomous vehicle in accordance with various embodiments.

FIG. 5 is an exemplary process 500 for predictive sensor cleaning system of an autonomous vehicle in accordance with various embodiments. By way of example, the process may proceed at step 505, where the autonomous vehicle with one or more sensors may detect whether the autonomous vehicle is turned on.

Next, at step 510, the autonomous vehicle may determine a direction of a motion of a vehicle based on a predicted navigational position of the vehicle. In other embodiments, step 510 may alternatively include receive autonomous vehicle receiving data of navigation and time-date information of the environmental conditions in a direction of motion of the autonomous vehicle. With reference to FIGS. 1-4 the autonomous vehicle may schedule cleaning of sensors during one or more critical period, e.g., intersection, approaching vehicle, and the like, in a direction of motion and identify its surrounding environment, road, and driving conditions based on the data collected from its in-vehicle devices, such as the cameras, sensors, navigation system, radar, laser scanner, and communication system.

Next, at step 515, the autonomous vehicle determines, based at least in part on the predicted navigational position, a change in a future light positional information that may be received by the one or more sensors compared to a current light positional information being received by the one or more sensors. Step 515 may additionally determine, if one or more sensors require cleaning based on light positional information received as part of the navigation and time-date information in the direction of motion of the autonomous vehicle. The direction of motion may be determined from GPS route guidance provided by the navigation system. Additionally, the direction of motion may also be determined based on the environmental conditions detected by the autonomous vehicle. Thus, the direction of motion may be continuously updated in real time based on the real environmental conditions detected by the autonomous vehicle.

In various embodiments, the light positional information includes an angle of light and an intensity of the light at the one or more sensors in the direction of motion of the autonomous vehicle. In one instance, determining if the one or more sensors require cleaning based on light positional information includes calculating a navigational route heading and a sensor cleaning algorithm utilizing a route prediction algorithm based on an angle of light and an intensity of light at the one or more sensors in the direction of motion of the autonomous vehicle.

In one example, determining if one or more sensors require cleaning based on light positional information comprises scheduling cleaning of the one or more sensors based on a navigational route heading causing a daylight glare index between 20 to 50 percent.

In yet another example, determining if one or more sensors require cleaning based on light positional information comprises predicting when the autonomous vehicle will be heading substantially directly into a direction of the sun, and scheduling cleaning of the one or more sensors prior to when the autonomous vehicle will heading based on an autonomous vehicle position and heading, navigation based route information, and a time/date to predict when the vehicle is substantially directly in a direction of motion into the sun.

In yet another example, in determining if one or more sensors require cleaning based on light positional information comprises predicting when the autonomous vehicle will be heading substantially directly into a direction of sun glare, and scheduling cleaning of the one or more sensors prior to when the autonomous vehicle will heading based on an autonomous vehicle position and heading, navigation based route information, and a time/date to predict when the vehicle is substantially directly in a direction of motion into the sun.

In yet another example, determining if one or more sensors require cleaning based on light positional information comprises scheduling cleaning of a camera lens or a visual surface of the one or more sensors that is sensitive to an angle and an intensity of an external light source based on a navigational route heading, route prediction algorithm, and a current measured debris and contamination condition of at least of one of the one or more sensors in the direction of motion of the autonomous vehicle. In one or more embodiments, determining if one or more sensors require cleaning based on light positional information comprises scheduling cleaning of a camera lens or a visual surface of the one or more sensors that is sensitive to an angle and an intensity of an external light source based on a navigational route heading, route prediction algorithm based on predicted angle of light and an intensity of light shining on the one or more sensors at an intersection or a road junction that turns into a direct of an external light source.

Next, at step 520, the system may clean the one or more sensors of the vehicle prior to the change in the future light positional information and prior to the vehicle reaching the predicted navigational position. Step 520 may further include cleaning the one or more sensors based on the current light positional information and the future light positional information of the autonomous vehicle in the direction of motion of the autonomous vehicle.

Other steps may include adjusting the direction of motion of the autonomous vehicle based on the one or more cleaned sensors receiving the navigation and time-date information utilizing one or more autonomous vehicle actions. The adjusted direction of motion may be determined from GPS route guidance provided by the navigation system. Additionally, the adjusted direction of motion may also be determined based on the environmental conditions detected by the autonomous vehicle. Thus, the adjusted direction of motion may be continuously updated in real time based on the real environmental conditions detected by the autonomous vehicle.

As illustrated in FIGS. 1-4 above, one or more autonomous vehicle actions include any of steering, accelerating, and braking. In a related embodiment, the presenting the adjusted direction of motion includes the presenting the adjusted direction of motion within the autonomous vehicle.

In some instances, the smart sensor cleaning system and/or the sensor system may be turned on (or activated) in certain environmental conditions, such as when the autonomous vehicle detects the presence of high intensity light beam or changed lighting condition. In other instances, the smart sensor cleaning system or the sensor system may turn on whenever the autonomous vehicle is turned on.

Figure 6:
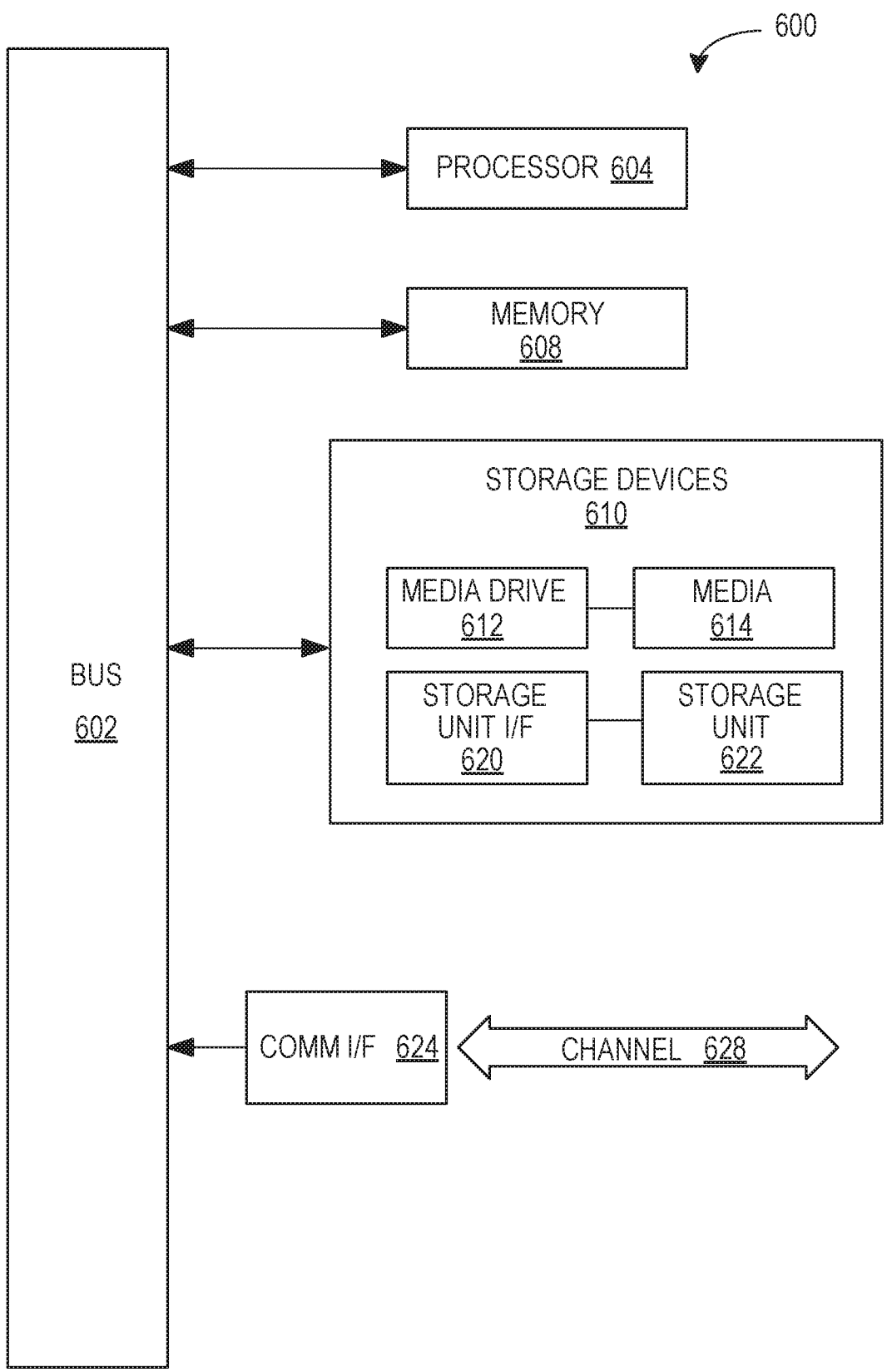
FIG. 6 is a schematic illustrating the computing components that may be used to implement various features of embodiments described in the present disclosure.

As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features and functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices. This can include a processor, and/or any one or more of the components making up navigation system 630 and its component parts, navigation server/network and controller. Processor 604 might be implemented using a general-purpose or special-purpose processing engine such as, for example, a microprocessor, controller, or other control logic. Processor 604 may be connected to a bus 602. However, any communication medium can be used to facilitate interaction with other components of computing component 600 or to communicate externally.

Computing component 600 might also include one or more memory components, simply referred to herein as main memory 608. For example, random access memory (RAM) or other dynamic memory might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or storage media 614. For example, a hard disk drive, a solid-state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, and optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and a storage unit interface 620. Examples of such storage units 622 and storage unit interface 620 can include a program cartridge and cartridge interface, a removable memory (for example, a flash memory or other removable memory component) and memory slot. Other examples may include a PCMCIA slot and card, and other fixed or removable storage unit 622 and storage unit interface 620 that allow software and data to be transferred from storage unit 622 to computing component 600.

Computing component 600 might also include a communications interface 624.

Communications interface 624 might be used to allow software and data to be transferred between computing component 600 and external devices. Examples of communications interface 624 might include a modem or soft modem, a network interface (such as an Ethernet, network interface card, WiMedia, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., main memory 608, storage unit interface 620, storage media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A system, comprising:
one or more processors; and
memory storing instructions that, when executed by the one or more processors, cause the system to perform:
determining a direction of motion of a vehicle based on a predicted navigational position of the vehicle;
predicting, based at least in part on the predicted navigational position, a change in a future light positional information received by one or more sensors compared to a current light positional information being received by the one or more sensors;
predicting that a density of vehicles at the predicted navigational position will exceed a threshold density; and
in response to predicting that the density of vehicles will exceed the threshold density, cleaning, prior to the predicted change in the future light positional information and prior to the vehicle reaching the predicted navigational position, the one or more sensors of the vehicle based on:
a predicted time at which the direction of motion of the vehicle is substantially directly in a direction corresponding to the future light positional information; and
an angle and an intensity of light received by the one or more sensors at the predicted time.

2. The system of claim 1, wherein the current light positional information comprises an angle of light and an intensity of a light beam at the one or more sensors in the direction of motion of the vehicle.

3. The system of claim 1, wherein the future light positional information comprises an angle of light and an intensity of a light beam at the one or more sensors in the direction of motion of the vehicle.

4. The system of claim 1, further comprising determining if the one or more sensors require cleaning based on sensor data.

5. The system of claim 4, wherein the cleaning of the sensors comprises cleaning using pressurized heated water.

6. The system of claim 4, wherein determining if one or more sensors require cleaning comprises predicting when the vehicle will be heading substantially directly into a direction of a sun, and scheduling cleaning of the one or more sensors based on a vehicle position and heading, the navigational route heading, and a time to predict when the vehicle is substantially directly in the direction to the sun.

7. The system of claim 4, wherein determining if one or more sensors require cleaning comprises scheduling cleaning of a camera lens or a visual surface of the one or more sensors that is sensitive to an angle and an intensity of an external light source based on the navigational route heading, a route prediction algorithm, and a current measured debris and contamination condition of at least of one of the one or more sensors.

8. The system of claim 4, wherein determining if one or more sensors require cleaning comprises scheduling cleaning of a camera lens or a visual surface of the one or more sensors that is sensitive to an angle and an intensity of an external light source based on the navigational route heading, and the route prediction algorithm based on a predicted angle of light and an intensity of light shining on the one or more sensors at an intersection or a road junction that turns into a direct path of the external light source.

9. The system of claim 1, wherein the cleaning of the one or more sensors further comprises scheduling the cleaning based on a previous sensor performance following a previous sensor cleaning.

10. The system of claim 1, wherein the cleaning of the one or more sensors is further based on a predicted weather condition at the predicted navigational position.

11. The system of claim 1, wherein the cleaning of the one or more sensors further comprises determining a turning direction of the vehicle and cleaning a sensor corresponding to the turning direction prior to the vehicle turning towards the turning direction.

12. The system of claim 1, wherein the cleaning of the one or more sensors is further based on a predicted proximity of barriers to the vehicle.

13. A method being implemented by a computing system including one or more physical processors and storage media storing machine-readable instructions, the method comprising:
   obtaining vehicle sensor data of a vehicle;
   receiving data of a navigational route heading and a time in a direction of motion of the vehicle based on the vehicle sensor data;
   determining if one or more sensors require cleaning based on a light positional information received as part of the navigational route heading and a time in the direction of motion of the vehicle;
   predicting that a density of vehicles at the predicted navigational position will exceed a threshold density; and
   in response to predicting that the density of vehicles will exceed the threshold density, cleaning the one or more sensors based on:
      a predicted time at which the direction of motion of the vehicle is substantially directly in a direction corresponding to the future light positional information; and
      an angle and an intensity of light received by the one or more sensors at the predicted time.

14. The method of claim 13, wherein cleaning the one or more sensors based on the light positional information is performed prior to a predicted high intensity light event on the navigational route.

15. The method of claim 13, wherein the light positional information comprises an angle of light and an intensity of a light beam at the one or more sensors in the direction of motion of the vehicle.

16. The method of claim 13, wherein determining if the one or more sensors require cleaning based on light positional information comprises calculating the navigational route heading and a sensor cleaning algorithm utilizing a route prediction algorithm based on an angle of light and an intensity of light at the one or more sensors in the direction of motion of the vehicle.

17. The method of claim 13, wherein the cleaning of the sensors comprises cleaning using pressurized heated water.

18. The method of claim 13, wherein determining if one or more sensors require cleaning based on light positional information comprises scheduling cleaning of a camera lens or a visual surface of the one or more sensors that is sensitive to an angle and an intensity of an external light source based on the navigational route heading, a route prediction algorithm, and a current measured debris and contamination condition of at least of one of the one or more sensors in the direction of motion of the vehicle.

19. The method of claim 13, wherein determining if one or more sensors require cleaning based on light positional information comprises scheduling cleaning of a camera lens or a visual surface of the one or more sensors that is sensitive to an angle and an intensity of an external light source based on the navigational route heading, a route prediction algorithm based on predicted angle of light and an intensity of light shining on the one or more sensors at an intersection or a road junction that turns into a direction of an external light source.

20. A non-transitory computer readable medium comprises instructions that, when executed, cause one or more processors to perform:
   obtaining vehicle sensor data of a vehicle;
   receiving data of a navigation route heading and a time-date in a direction of motion of the vehicle based on the vehicle sensor data;
   determining if one or more sensors require cleaning based on light positional information received as part of a navigational route heading and a time in the direction of motion of the vehicle; predicting that a density of vehicles at the predicted navigational position will exceed a threshold density; and
   in response to predicting that the density of vehicles will exceed the threshold density, cleaning the one or more sensors based on:
      a predicted time at which the direction of motion of the vehicle is substantially directly in a direction corresponding to the future light positional information; and
      an angle and an intensity of light received by the one or more sensors at the predicted time.

* * * * *